United States Patent

Masuda et al.

Patent Number: 6,084,657
Date of Patent: Jul. 4, 2000

[54] OPTICAL SHUTTER DEVICE

[75] Inventors: Tomohiko Masuda; Kenichi Wada, both of Takatsuki; Tsukasa Yagi, Kobe, all of Japan

[73] Assignee: Minolta Co., Ltd., Osaka, Japan

[21] Appl. No.: 09/150,234

[22] Filed: Sep. 10, 1998

[30] Foreign Application Priority Data

Sep. 11, 1997 [JP] Japan ................................. 9-246307

[51] Int. Cl.[7] .......................... G03B 27/72; G03B 27/54
[52] U.S. Cl. ............................ 355/71; 355/67; 359/246; 359/290
[58] Field of Search .......................... 355/67, 71, 53.54; 350/355, 356, 371, 374, 384, 392, 393; 359/290, 301, 323, 246

[56] References Cited

U.S. PATENT DOCUMENTS

| | | | |
|---|---|---|---|
| 4,887,104 | 12/1989 | Kitano et al. .......................... | 350/355 |
| 5,011,271 | 4/1991 | Saito et al. . | |
| 5,745,280 | 4/1998 | Kitano .................................. | 359/290 |

FOREIGN PATENT DOCUMENTS 63-189833  5/1988  Japan .

*Primary Examiner*—Howard B. Blankenship
*Assistant Examiner*—Rodney Fuller
*Attorney, Agent, or Firm*—McDermott, Will & Emery

[57] ABSTRACT

An optical shutter device wherein a light emitted from a light source is allowed to be incident to a polarization shutter chip through a fiber array and then the light is caused to pass through the chip by turning on a voltage to be applied to electrodes connected to transmittable portions corresponding to pixels, so that a receptor surface is lighted through an imaging lens array. Light which is incident to the polarization shutter chip at an angle $\theta_0$ is reflected from electrode vertical surfaces, and then the light outgoes from the transmittable portions in the form of leakage light. However, the aperture angle of a lens unit of the imaging lens array is set smaller than the incident angle $\theta_0$, and thus the light (which were incident) at the angle $\theta_0$ (leakage light) is not focused on the receptor surface by the lens unit.

7 Claims, 13 Drawing Sheets

F I G. 1
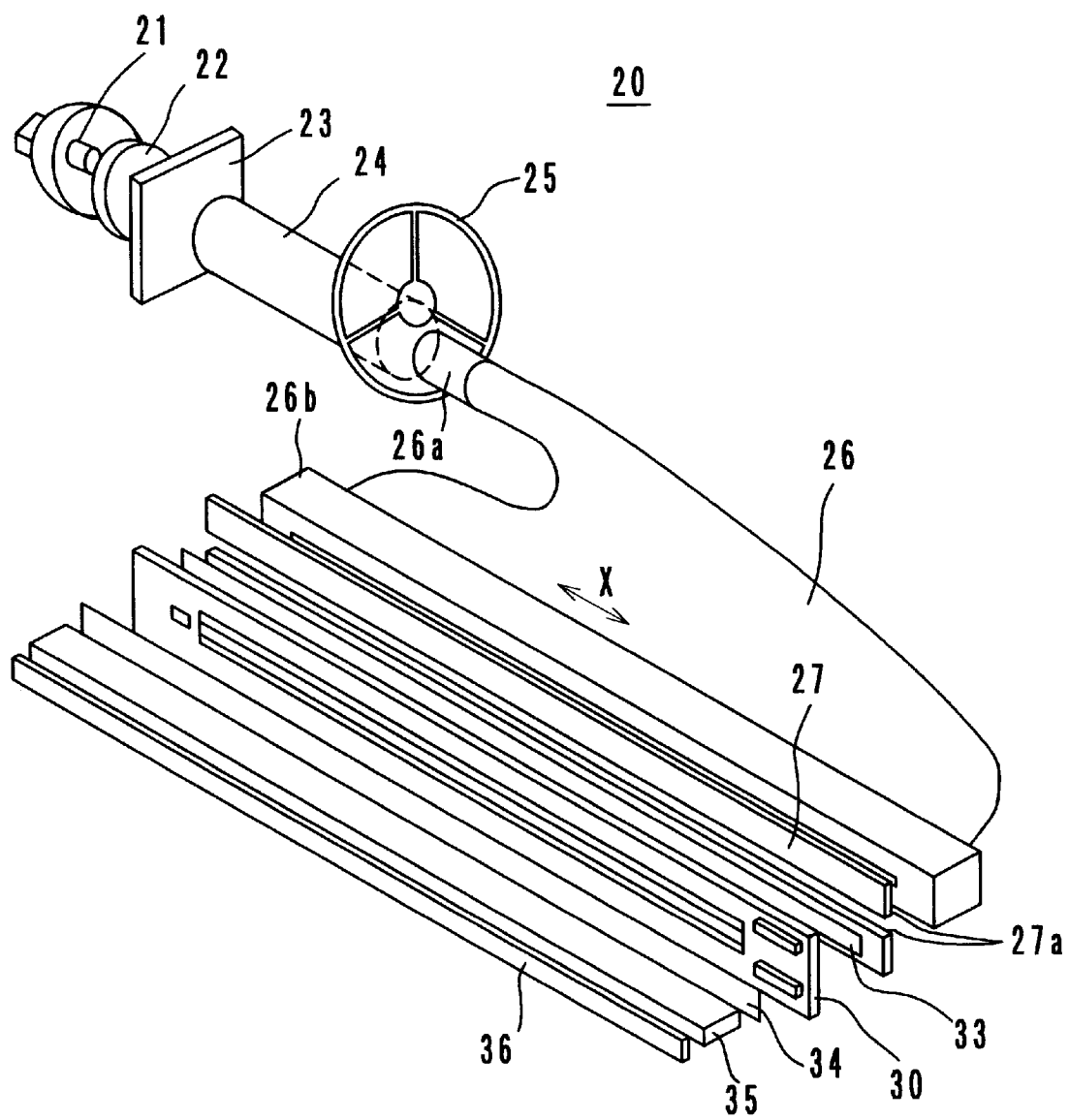

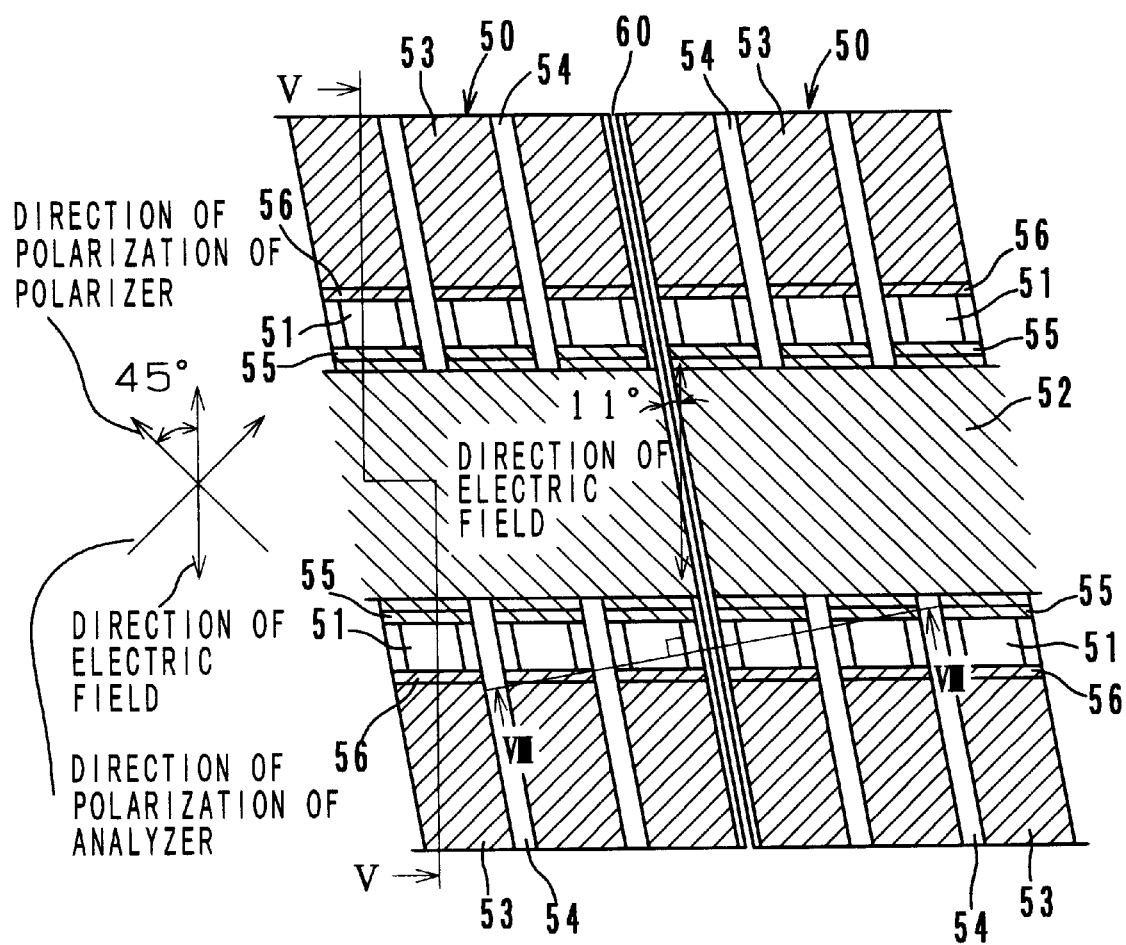
F I G. 4

F I G. 5
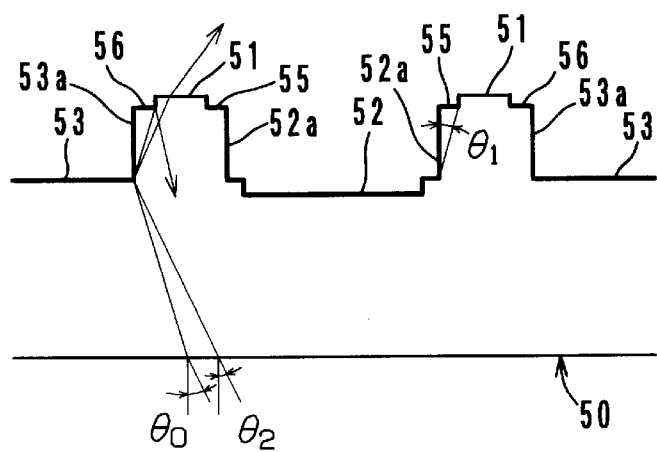
F I G. 6
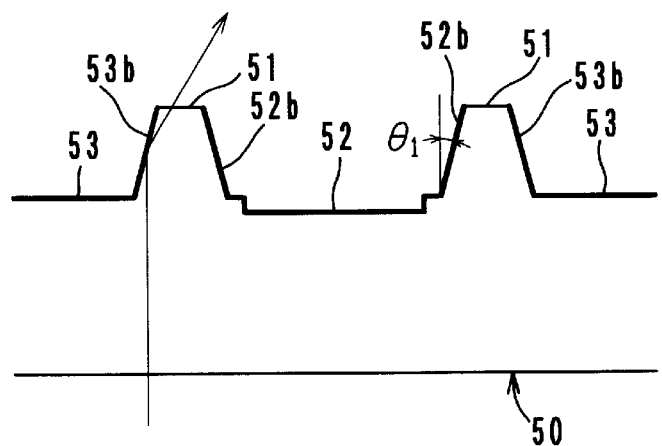
F I G. 7
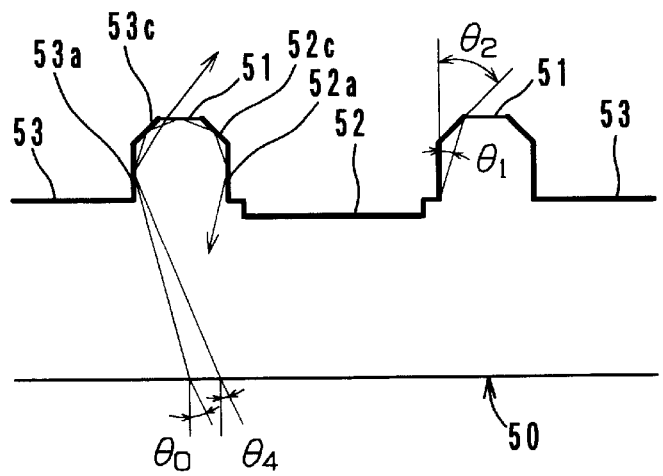

F I G. 1 8
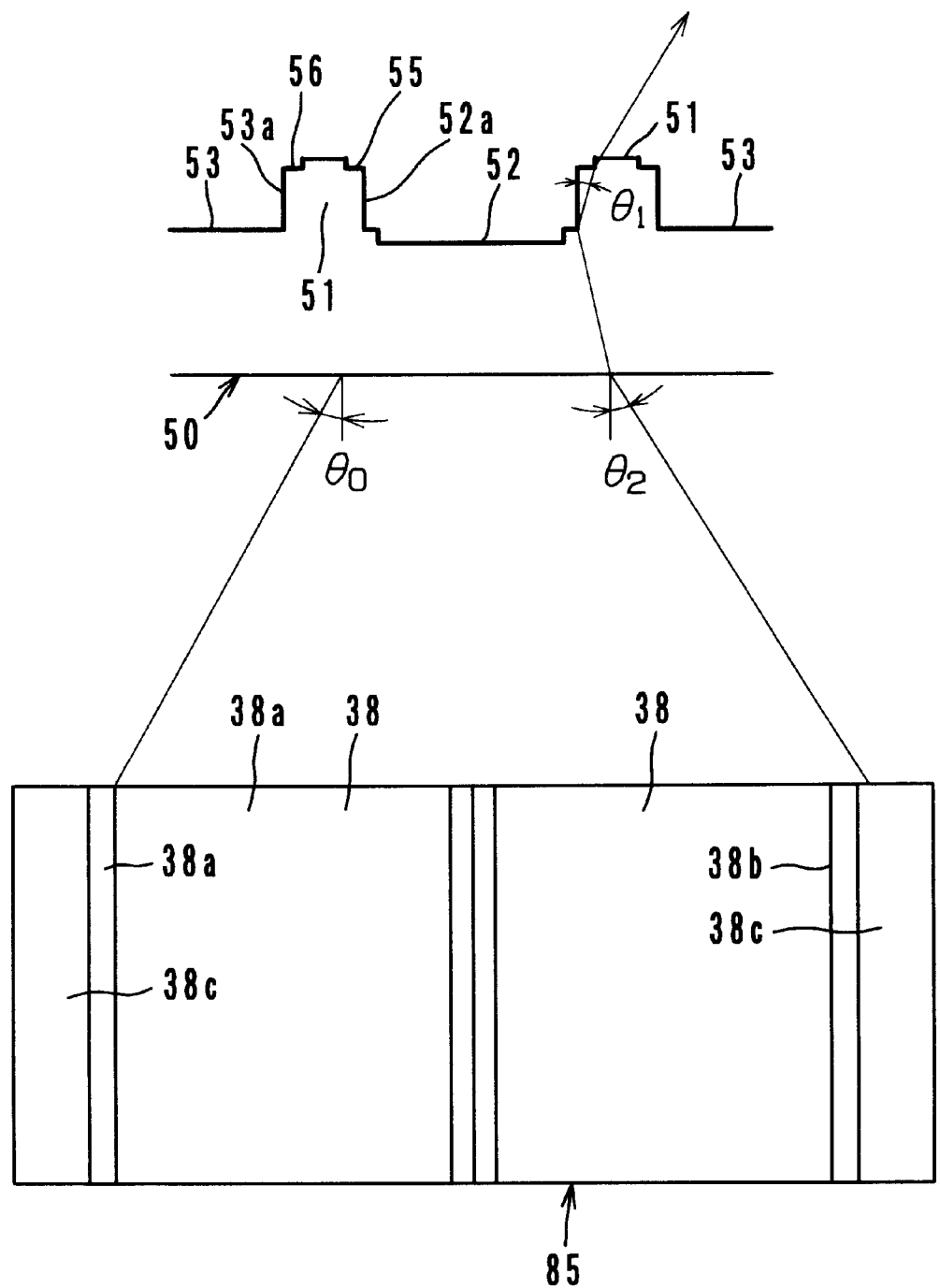

FIG. 19
PRIOR ART
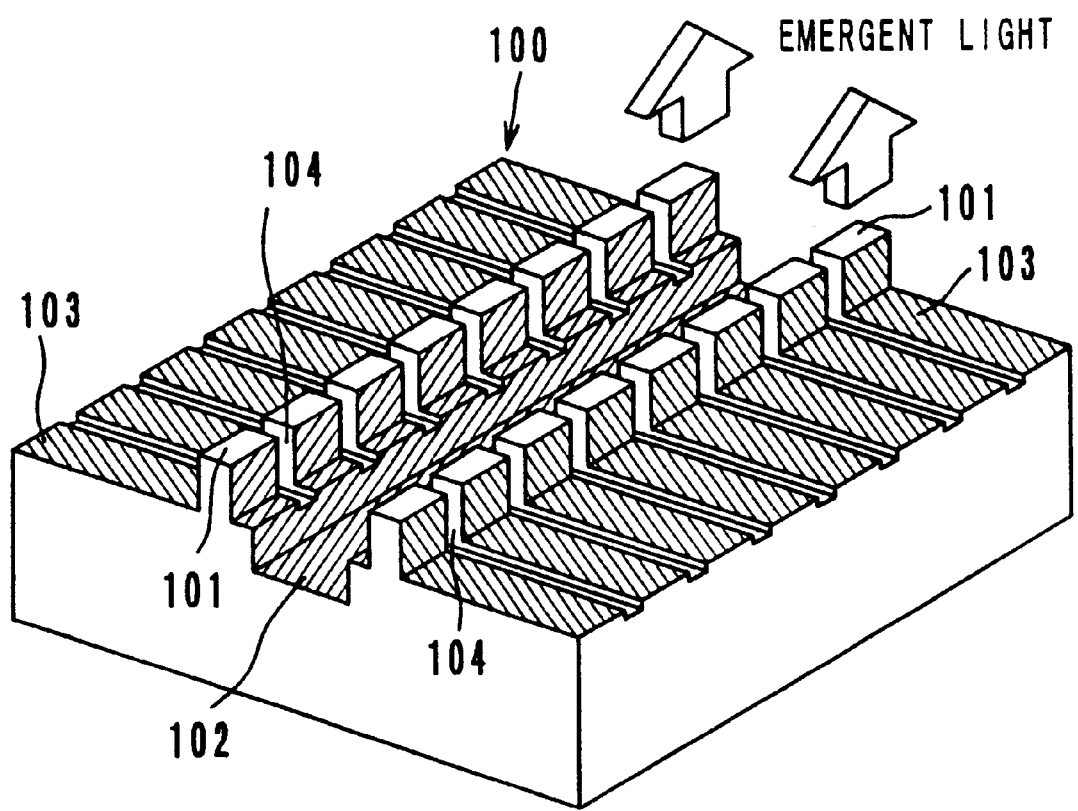
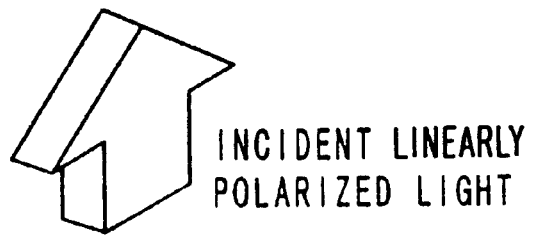

OPTICAL SHUTTER DEVICE

This application is based on application No. 9-246307 filed in Japan, the contents of which are hereby incorporated by reference.

BACKGROUND OF THE INVENTION

1. Field of the Invention

The present invention relates to an optical shutter device, and more particularly to an optical shutter device which has polarization shutter chips made of PLZT and is used to write an image on a receptor surface such as a photosensitive member or the like.

2. Description of Related Art

In order to write an image (latent image) on a photographic paper using a silver halide photosensitive material and an electrophotographic photosensitive member, there have been heretofore provided various solid scanning type optical writing apparatuses for controlling turning-on and turning-off of light on a pixel-by-pixel basis by the use of polarization shutter chips made of PLZT having an electro-optic effect of a high Kerr constant. It is effective to adapt such polarization shutter chips to have a stereostructure in order to achieve a high contrast and a low driving voltage. A multi-chip system is also employed in which a plurality of PLZT chips with plural pixels are linearly aligned in order to constitute a longer one-dimensional optical shutter module. However, thus constituted one-dimensional optical shutter module has a problem that light leaks from vertical electrodes, pixel separating grooves and chip cut surfaces (seams), which may lower the contrast.

The leakage of light is described. FIG. 19 shows an example of a conventional PLZT shutter chip having a stereostructure. This shutter chip 100 is provided with a common electrode 102 and separate electrodes 103 extending to the vertical surfaces of transmittable portions 101. Each transmittable portion 101 corresponding to one pixel rotates the plane of polarization of light when an electric field is generated by the application of a voltage to the electrodes 102 and 103, and thereby, the light is turned on and off pixel by pixel. The electrodes 102 and 103 are formed on vertical surfaces parallel to an optical path, so that the driving voltage (half-wavelength voltage) capable of obtaining a maximum quantity of transmitted light is reduced.

Grooves 104 for separating the transmittable portions 101 and the separate electrodes 103 from one another enable each of the transmittable portions 101 to be independently driven. The grooves 104 also prevent an operation of the transmittable portion 101 due to the application of an electric field from the adjacent transmittable portions 101, that is, a crosstalk.

θ is assumed to be taken as the angle of the direction of polarization of incident linearly polarized light to the direction of electric field generated by the electrodes 102 and 103. In this case, when the half-wavelength voltage is applied to the electrodes 102 and 103, the relationship between the intensity $I_0$ of incident light and the intensity I of emergent light is represented by the following expression (1).

$$I\ I_0 \sin^2 2\theta \qquad (1)$$

θ is then set to 45° in order to obtain the maximum quantity of transmitted light.

The optical shutter module is constituted so that a plurality of the chips 100, each having a plurality of the transmittable portions 101, are linearly aligned on a glass substrate or, if not transparent, a substrate having an opening formed thereon, on which a polarizer and an analyzer are arranged on the incident side and the emergent side, respectively.

FIG. 20 shows the optical shutter module constituted as described above. The transmittable portions 101 are arranged in two rows in a zigzag pattern so that an optical signal may be provided to a receptor surface to be scanned without any gap in a main scanning direction. Therefore, the grooves 104 for separating the transmittable portions 101 and the separate electrodes 103 are formed to satisfy geometrical conditions for scanning without any gap regardless of the direction of electric field. In FIG. 20, the separating grooves 104 are at an angle of 11° to the direction of electric field. Since the multi-chip system is employed, seams 110 among the chips 100 are parallel to the separating grooves 104.

In such an optical shutter module, space areas such as the separating grooves 104 and the seams 110, in addition to both sides of the transmittable portions 101, are therefore formed. Light reflected from the vertical surfaces in these space areas results in so-called leakage light passing through the analyzer whose direction of polarization is perpendicular to the direction of polarization of incident linearly polarized light, so that the contrast of the image is thus lowered.

The factors are described with reference to FIG. 21. Part of light which is incident to the module at a certain angle is incident to the vertical surfaces 104a and 110a from the air and then reflected from the surfaces 104a and 110a, and this light is called externally reflected light and denoted by La. The light La is composed of a component of p-polarized light and a component of s-polarized light having reflectance properties depending on the incident angle as shown by curves Rp and Rs in FIG. 22, respectively. The p-polarized light means the polarized light parallel to the reflecting surface, while the s-polarized light means the polarized light perpendicular to the reflecting surface. The refractive index of PLZT is 2.5. As can be seen from FIG. 22, the respective reflectance properties Rp and Rs of the p-polarized light and the s-polarized light of the externally reflected light greatly differ. Thus, the incident linearly polarized light outgoes in the form of polarized light whose direction of polarization is changed, passes through the analyzer and then results in leakage light.

On the other hand, in FIG. 21, light (internally reflected light) Lb is incident to the vertical surfaces 104a and 110a from the inside of the chip 100 and then reflected from the surfaces 104a and 110a. The light Lb is composed of a component of p-polarized light and a component of s-polarized light having phase-angle properties depending on the incident angle as shown by curves δp and δs in FIG. 23, respectively. As can be seen from FIG. 23, the respective phase-angle properties δp and δs of the p-polarized light and the s-polarized light of the internally reflected light greatly differ. Thus, the incident linearly polarized light is changed into elliptically polarized light, passes through the analyzer and then results in leakage light.

In short, it has been unavoidable that leakage light is caused due to the externally and internally reflected light. Even when the driving voltage is turned off, light outgoes from the optical shutter module, which thus causes the contrast to be lowered on the receptor surface.

SUMMARY OF THE INVENTION

It is therefore an object of the present invention to provide an optical shutter device which can prevent light from leaking from space areas of polarization shutter chips as much as possible, thereby obtaining a high-contrast image.

In order to achieve the above object, in an optical shutter device according to the present invention, light reflected from vertical surfaces of a polarization shutter chip is not focused on a receptor surface. More specifically, the aperture angle of an imaging optical element for focusing light on the receptor surface or the aperture angle of a lighting optical element for illuminating the polarization shutter chip is limited. Alternatively, the vertical surfaces and the direction of polarization of incident light are so set as to be substantially perpendicular or parallel to each other.

According to the present invention, since light reflected on the vertical surfaces of the polarization shutter chip is prevented from being focused on the receptor surface as much as possible, leakage light resulting from externally reflected light and/or internally reflected light on the vertical surfaces is suppressed, and thus the contrast on the receptor surface can be improved.

BRIEF DESCRIPTION OF THE DRAWINGS

This and other objects and features of the present invention will become apparent from the following description with reference to the accompanying drawings, in which:

FIG. 1 is a perspective view of an optical writing head of an embodiment of the present invention;

FIG. 4 is a plan view of a third embodiment of the optical shutter module;

FIG. 5 is a cross sectional view taken on line V—V of FIG. 4;

FIG. 6 is a cross sectional view of a fourth embodiment of the optical shutter module;

FIG. 7 is a cross sectional view of a fifth embodiment of the optical shutter module;

FIG. 18 is an illustration showing the relationship between the optical shutter module and a lighting lens array;

FIG. 19 is a perspective view of a conventional polarization shutter chip;

DETAILED DESCRIPTION OF THE PREFERRED EMBODIMENTS

Figure 2:
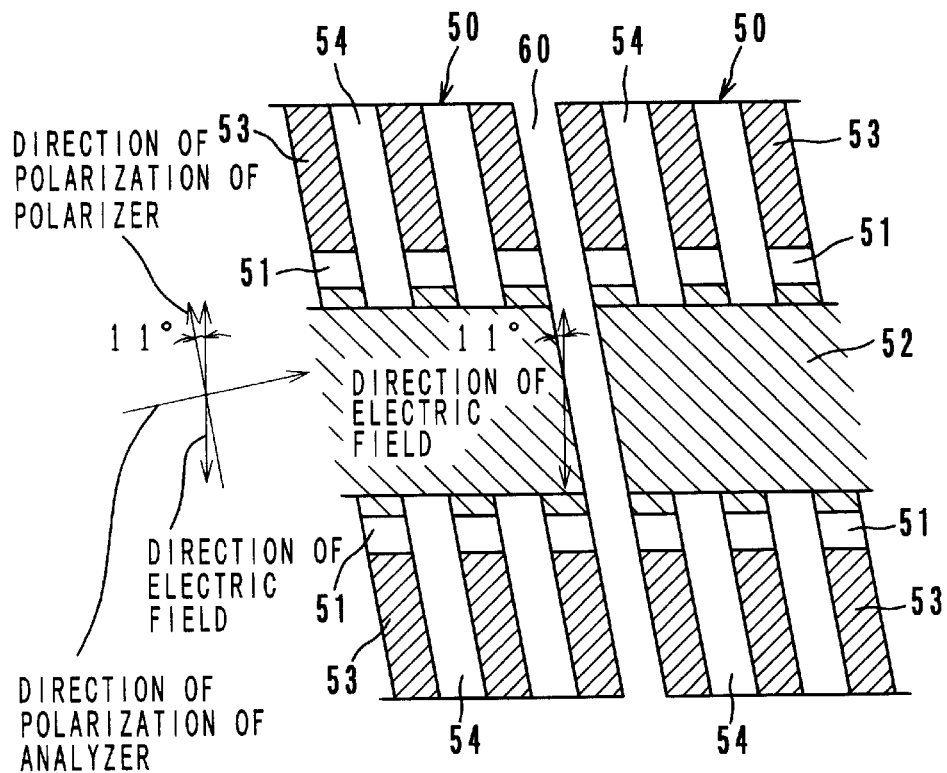
FIG. 2 is a plan view of a first embodiment of an optical shutter module employed in the optical writing head.

Preferred embodiments of an optical shutter device according to the present invention will be described below with reference to the accompanying drawings.

FIG. 1 shows an optical writing head 20 for writing a full color image on a photographic paper made of a silver halide photosensitive material. This optical writing head 20 generally comprises a halogen lamp 21, a heat shield filter 22, a color control filter 23, a diffuser cylinder 24, an RGB filter 25, a fiber array 26, a slit plate 27, an optical shutter module 30, an imaging lens array 35 and a dust-proof glass 36.

Light emitted from the halogen lamp 21 is cut on its heat rays (infrared components) by the heat shield filter 22. Then, the optical properties of the emitted light are controlled by the color control filter 23 so that they may be adapted to the spectral sensitivity properties of the photographic paper. The diffuser cylinder 24 is used for improving the light usage efficiency and suppressing the non-uniformity in quantity of light. The RGB filter 25 is driven to rotate in synchronization with the writing by the optical shutter module 30 described below so as to change a color passing therethrough on a line-by-line basis.

The fiber array 26 is made into a bundle on one end by a base 26a so as to be opposite to the diffuser cylinder 24 through the RGB filter 25. The fiber array 26 is made into a bundle on the other end by a base 26b so as to be aligned in the main scanning direction indicated by an arrow X and to thereby cause light to outgo in a linear manner. Slit end surfaces 27a of the slit plate 27 are mirror-finished so as to efficiently guide the light emergent from the fiber array 26 to the optical shutter module 30. The slit plate 27 is also provided with a heater (not shown) for maintaining polarization shutter chips at a constant temperature, and the temperature is regulated in accordance with the detection result of a temperature-detection device (not shown) disposed in the module 30.

The optical shutter module 30 has a plurality of polarization shutter chips made of PLZT on a slit-shaped opening on a ceramic substrate or on a glass substrate, and driver ICs are arranged in parallel to the polarization shutter chips. Each polarization shutter chip has a stereostructure divided into areas corresponding to pixels, and the areas of the polarization shutter chip are individually driven by the driver IC. A polarizer 33 and an analyzer 34 are also arranged in front of and at the back of the module 30, respectively, and their directions of polarization are at an angle of 90° to each other. As well known, PLZT is a transmittable ceramic having an electro-optic effect of a high Kerr constant. Thus, light linearly polarized by the polarizer 33 is rotated on the plane of polarization thereof by turning-on/off of electric field generated by the application of a voltage to the polarization shutter chips, whereby light emergent from the analyzer 34 is turned on/off.

The light emergent from the analyzer 34 passes through the imaging lens array 35 and the dust-proof glass 36, and is focused on the photographic paper, and thus, a latent image is formed. The photographic paper is carried at a constant speed in the direction (sub scanning direction) perpendicular to the main scanning direction X.

Figure 21:
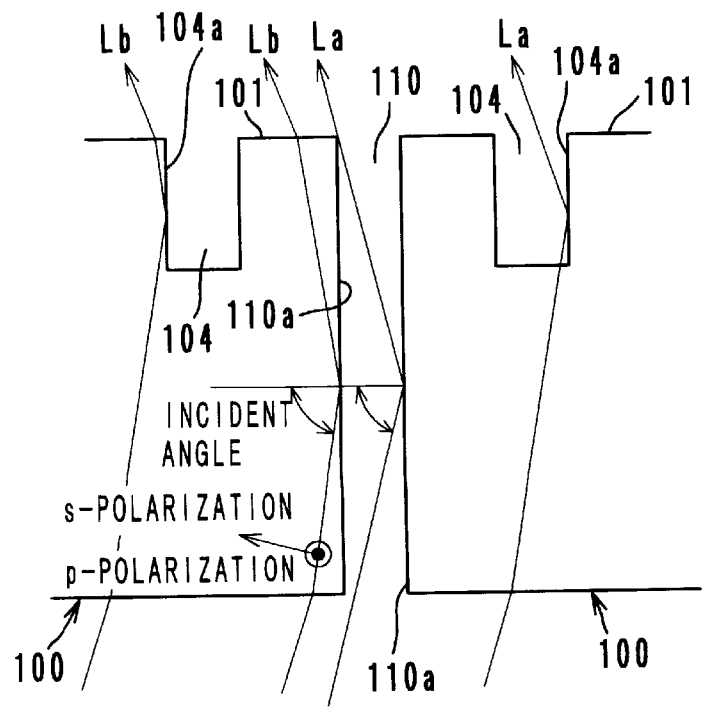
FIG. 21 is a cross sectional view taken on line XXI—XXI of FIG. 20.
Figure 22:
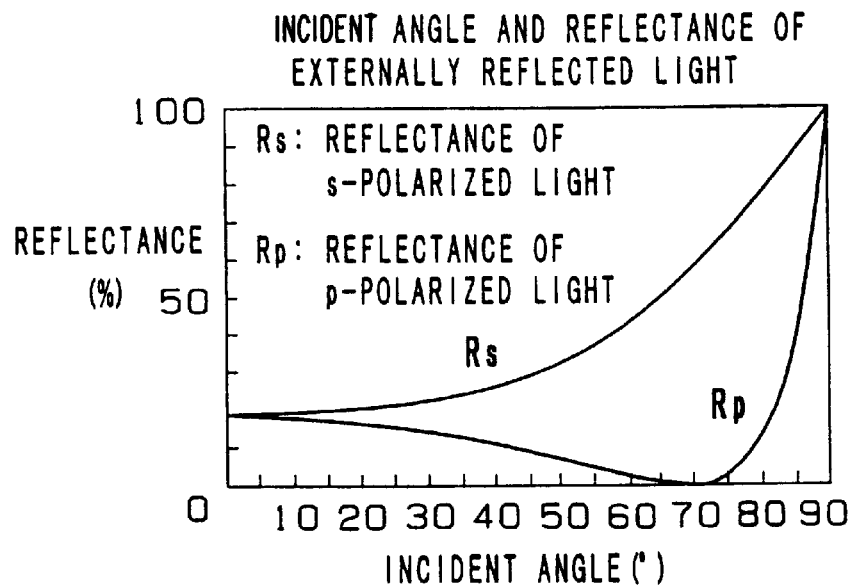
FIG. 22 is a graph showing the relationship between the reflectance and the incident angle of externally reflected light to the polarization shutter chip.
Figure 23:
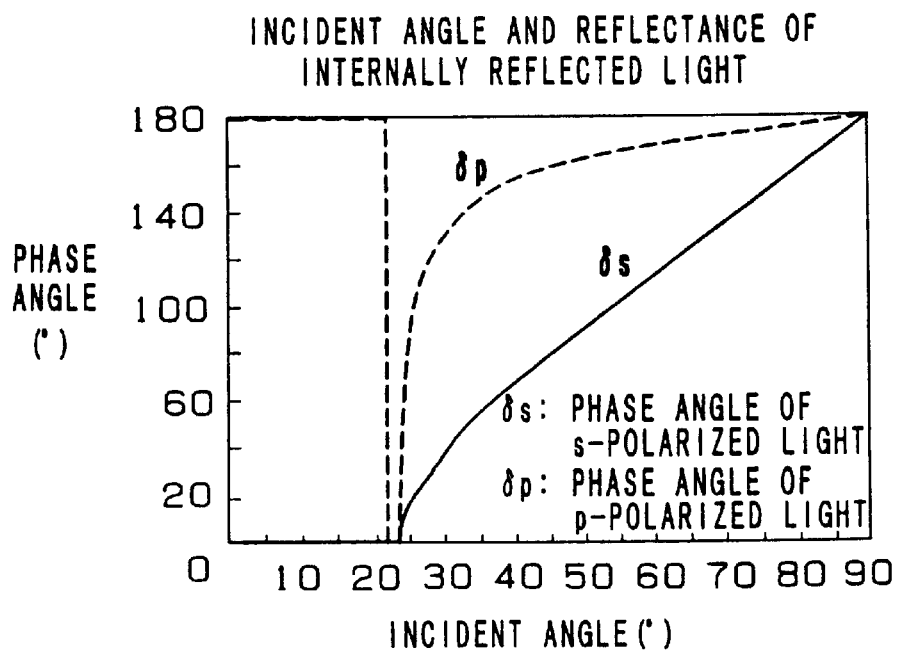
FIG. 23 is a graph showing the relationship between the phase angle and the incident angle of internally reflected light to the polarization shutter chip.

FIG. 2 shows a first embodiment of the optical shutter module 30, illustrating a portion where two polarization shutter chips 50 are adjacent to each other. Each of the polarization shutter chips 50 has the same stereostructure as shown in FIG. 19 in which transmittable portions 51 corresponding to pixels are arranged in two rows in a zigzag pattern. In FIG. 2, numeral 52 denotes a common electrode, numerals 53 denote separate electrodes, numerals 54 denote separating grooves, and numeral 60 denotes a seam between the chips 50. As described above with reference to FIG. 21, externally reflected light La causes leakage of light due to the difference in reflectance between its component of p-polarized light and its component of s-polarized light, while internally reflected light Lb causes leakage of light due to the difference in phase angle between its component of p-polarized light and its component of s-polarized light. On the other hand, in the first embodiment shown in FIG. 2, the polarizer 33 is set in such a manner that the direction of polarization is parallel to the separating grooves 54 and the seam 60, that is, the direction of polarization is at an angle of 11° to the direction of electric field. Therefore, when incident linearly polarized light is reflected from the inside and outside of a wall surface of the chip 50, it has only a component of s-polarized light. Thus, externally reflected light is merely changed in its amplitude, and internally reflected light is merely changed in its phase. Consequently, the analyzer 34 blocks these lights from passing through the module 30.

In the first embodiment shown in FIG. 2, the directions of incident linearly polarized light and emergent linearly polarized light (the directions of polarization of the polarizer and the analyzer) may be set in the opposite direction in such a manner that externally reflected light and internally reflected light of the incident linearly polarized light have only a component of p-polarized light. Even in this case, leakage light can be, of course, removed.

In the above-described first embodiment, since the angle of the direction of electric field to the separating grooves 54 and the seam 60 is 11°, the direction of polarization $\theta$ of the incident linearly polarized light, the intensity $I_0$ of incident light and the intensity I of emergent light during the application of a half-wavelength voltage to the electrodes 52 and 53 have a mutual relationship represented by the above-mentioned expression (1). Accordingly, in the first embodiment, the intensity of light emergent from the transmittable portions 51 is unavoidably reduced.

Figure 3:
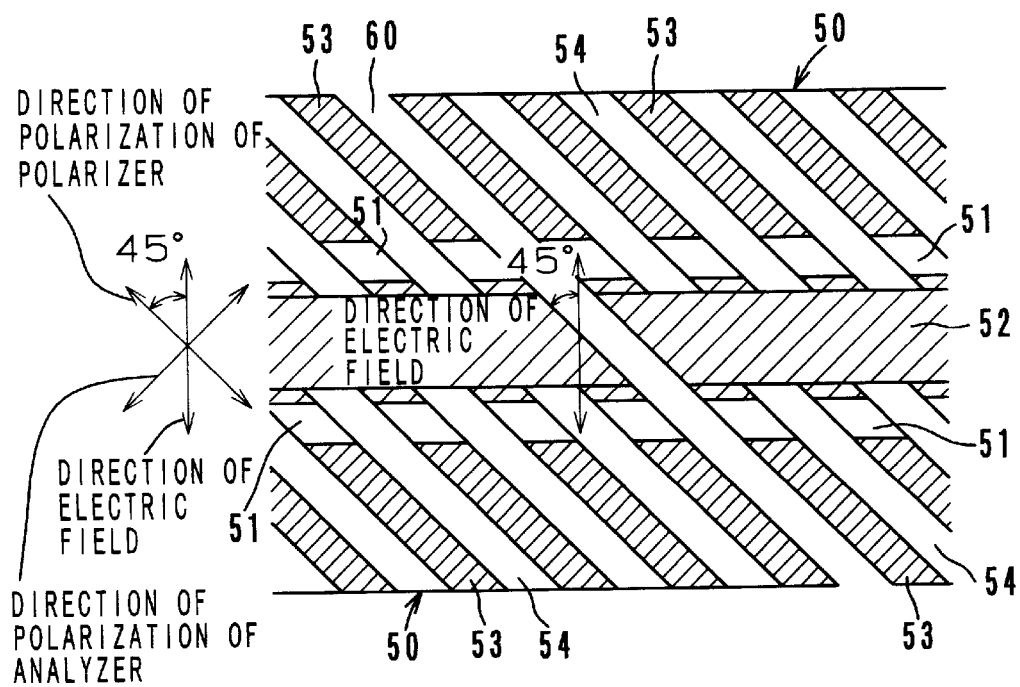
FIG. 3 is a plan view of a second embodiment of the optical shutter module.

FIG. 3 shows a second embodiment for preventing externally reflected light and internally reflected light from leaking and for preventing the intensity of light emergent from the transmittable portions 51 from decreasing. In the second embodiment, the angle of the direction of electric field to the direction of polarization of the polarizer is set to 45° so that the intensity of light emergent from the transmittable portions 51 may be maximum. In the same manner as the above-described first embodiment, the direction of polarization of the incident linearly polarized light is parallel to the separating grooves 54 and the seam 60.

In the first embodiment, transmittable portions 51 which are opposite to each other in two rows on the same oblique side are operated so as to output data for adjacent pixels in a row in the main scanning direction on a receptor surface. On the other hand, in the second embodiment, transmittable portions 51 which are opposite to each other in two rows on the same oblique side are operated so as to output data for pixels at an interval of two pixels in the main scanning direction on the receptor surface. Such a constitution can ensure a desired width for the width of the common electrode 52 and also enables the common electrodes 52 of chips 50 to be connected to each other by a wire bonding method to form a module. In the second embodiment, since the transmittable portions on both ends of the optical shutter module are not used to output image data on the receptor surface, they are always kept off during writing an image. Alternatively, light blocking resin or the like may be applied to the transmittable portions on both ends of the module.

Figure 8:
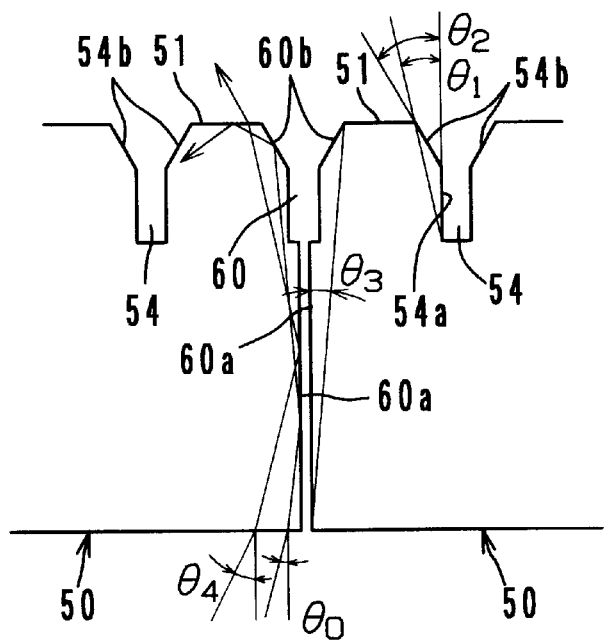
FIG. 8 is a cross sectional view taken on line VIII—VIII of FIG. 4.

FIG. 4 shows a third embodiment of the optical shutter module. FIG. 5 is a cross sectional view taken on line V—V of FIG. 4, and FIG. 8 is a cross sectional view taken on line VIII—VIII of FIG. 4. In the third embodiment, a step 55 and a step 56, where the common electrode 52 and the separate electrode 53 extend respectively, are formed in the periphery of each transmittable portion 51 (see FIG. 5). Inclined surfaces 54b are formed in each separating groove 54 (see FIG. 8). The seam 60 between the chips 50 is also provided with inclined surfaces 60b and cut surfaces 60a which makes the seam 60 narrower than the separating grooves 54 (see FIG. 8).

Internally reflected light from electrode vertical surfaces 52a and 53a will be described with reference to FIG. 5. In the same manner as the internally reflected light Lb shown in FIG. 21, the internally reflected light from the electrode vertical surfaces 52a and 53a make not only a difference in reflectance between the component of p-polarized light and the component of s-polarized light but also a phase difference due to the reflection on a metallic surface, and thus the light results in leakage light.

Consider cases that light is incident to the chip 50 at an incident angle of $\theta_0$ and at an incident angle of $\theta_2$, respectively ($\theta_0 < \theta_2$). Assuming that the refractive index of PLZT is taken as n, the incident angle and reflection angle on the electrode vertical surfaces 52a and 53a are represented by the following expressions (2) and (3).

$$90° - \sin^{-1}(\sin\theta_0/n) \qquad (2)$$

$$90° - \sin^{-1}(\sin\theta_2/n) \qquad (3)$$

It is assumed that the relationship between the angles $\theta_0$, $\theta_2$ and an angle $\theta_1$ on the steps 55 and 56 is established as represented by the following expression (4).

$$\{\sin^{-1}(\sin\theta_2/n)\} > \theta_1 > \{\sin^{-1}(\sin\theta_0/n)\} \qquad (4)$$

In this case, the light which is incident to the chip 50 at the incident angle $\theta_0$ and reflected from the electrode vertical surfaces 52a and 53a is reflected from the steps 55 and 56 and does not outgo from the transmittable portions 51. On the other hand, the light which is incident to the chip 50 at the incident angle $\theta_2$ and reflected from the electrode vertical surfaces 52a and 53a outgoes from the transmittable portions 51 at the same angle as the incident angle.

Therefore, the lens array 35 for focusing light emergent from the transmittable portions 51 on the receptor surface is so structured that its aperture angle $2\theta k$ may satisfy the following expression (5), whereby it is possible to prevent the receptor surface from being exposed to the internally reflected light from the electrode vertical surfaces 52a and 53a.

$$\theta k < \sin^{-1}(n \cdot \sin\theta_1) \qquad (5)$$

Figure 16:
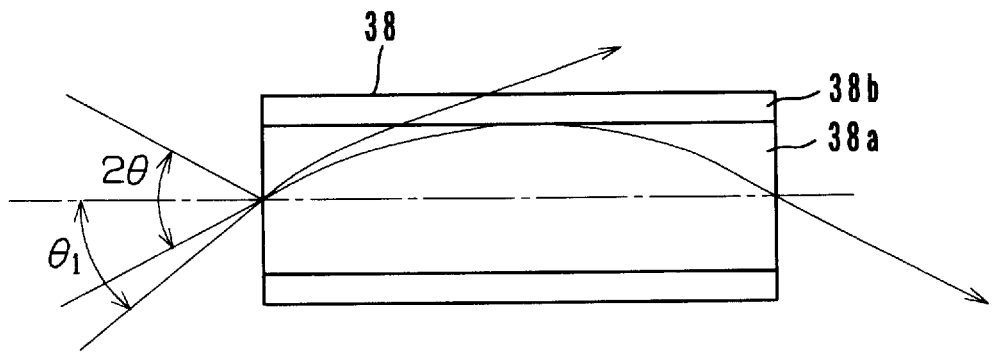
FIG. 16 is an illustration for describing the aperture angle of a converging optical transmission unit.

FIG. 16 is an illustration for describing the aperture angle of a converging optical transmission unit (SELFOC lens array: trade name of Nippon Sheet Glass Co., Ltd.) 38 constituted of the lens array 35. As well known, the core 38a of this unit 38 is covered over with a cladding 38b. In the case of this unit 38, the cladding 38b transmits light which is incident to the unit 38 at an angle $\theta_1$ larger than the aperture angle $2\theta$, and thus the light goes out from the cladding 38b. When the angle $\theta_1$ is such that the light is totally reflected from the core 38a, the light is not incident to the core 38a, of course.

Figure 17:
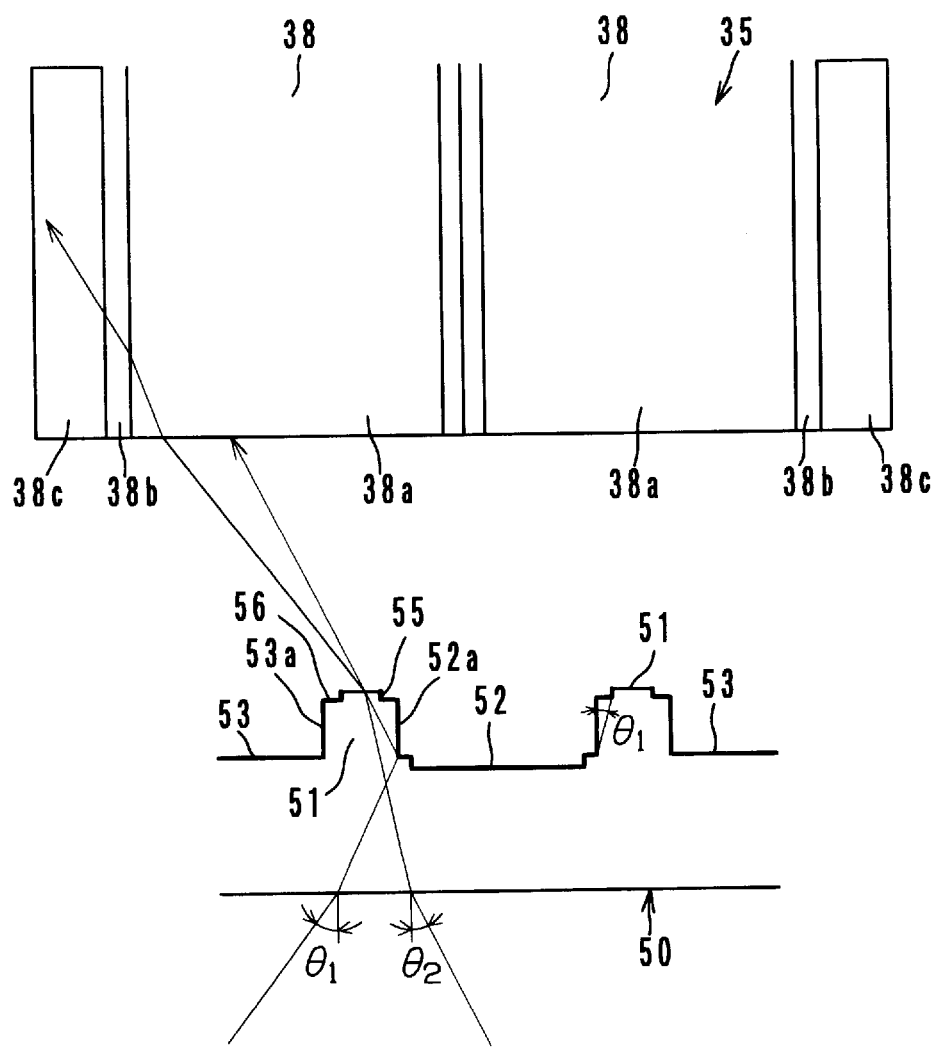
FIG. 17 is an illustration showing the relationship between the optical shutter module and an imaging lens array.
Figure 20:
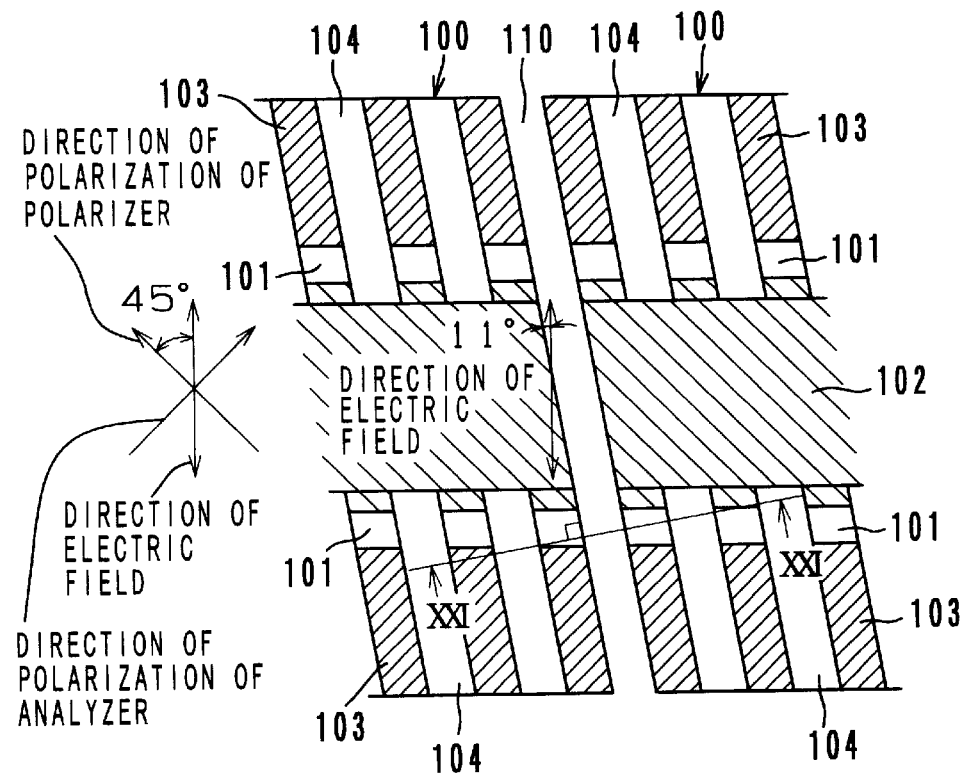
FIG. 20 is a plan view of the conventional polarization shutter chip.

Consider that light passing through the polarization shutter chip 50 of the constitution shown in FIG. 5 is focused on the receptor surface by the imaging lens array 35. In this case, as shown in FIG. 17, light which is incident to the module at an angle $\theta_1$ larger than the aperture angle of the lens unit 38 and reflected from the electrode vertical surfaces 52a and 53a passes through the cladding 38b and then is absorbed by an absorption layer 38c covering the outside of the cladding 38b. On the other hand, light which is incident to the module at an angle $\theta_2$ smaller than the aperture angle of the lens unit 38 and passes through the transmittable portions 51 is focused on the receptor surface by the lens unit 38.

Alternatively, lighting lens array 85 composed of aforementioned SELFOC lens array or a cylindrical lens is used in addition to the fiber array 26 for lighting the polarization shutter chips 50, and its aperture angle $2\theta r$ satisfies the following expression (6). It is thereby possible to prevent the receptor surface from being exposed to internally reflected light from the electrode vertical surfaces 52a and 53a.

$$\theta r < \sin^{-1} (n \cdot \sin \theta_1) \tag{6}$$

FIG. 18 shows the polarization shutter chip 50 of the structure shown in FIG. 5 illuminated by the lighting lens array 85 constituted as described above. In this case, the angle of light emitted from the lens units 38 is $\theta_0$ at maximum. This angle $\theta_0$ is smaller than the maximum incident angle $\theta_2$ of light which will be reflected from the electrode vertical surfaces 52a and 53a and will outgo from the transmittable portions 51. Therefore, the light which is emitted from these lens units 38 and is reflected from the electrode vertical surfaces 52a and 53a is all blocked by the steps 55 and 56 and thus does not outgo from the transmittable portions 51.

An optical shutter module of a fourth embodiment shown in FIG. 6 is different from the module shown in FIG. 5 in the shape of the polarization shutter chips 50. More particularly, the module of this fourth embodiment includes electrode inclined surfaces 52b and 53b. In this case, all the light reflected from the electrode inclined surfaces 52b and 53b outgoes from the transmittable portions 51 at an emergent angle of $\sin^{-1}$ (n·sin$\theta_1$) or more depending on the angle $\theta_1$. Therefore, as shown in FIGS. 17 and 18, if the imaging lens array 35 or the lighting lens array 85 is so constituted that its aperture angle $\theta k$ or $\theta r$ may satisfy the above-described expression (5) or (6), all the light reflected from the electrode inclined surfaces 52b and 53b can be blocked.

When the stereostructure of the polarization shutter chip 50 shown in FIG. 6 is formed by a cutting tool such as a known dicer, it is not necessary to work the steps 55 and 56 shown in FIG. 5, and thus a working process is simplified. Moreover, when the angle $\theta_1$ is equal to the angle $\theta_1$ of FIG. 5, the substantial distance between the common electrode 52 and each of the separate electrodes 53 is reduced, and thus the half-wavelength voltage is advantageously reduced. Furthermore, if the electrode inclined surfaces 52b and 53b are formed so that the angle $\theta_1$ may satisfy the following expression (7), all the light reflected from the electrode inclined surfaces 52b and 53b is totally reflected from the transmittable portions 51 and does not outgo from the transmittable portions 51.

$$\theta_1 \geq \sin^{-1} (1/n) \tag{7}$$

If the above expression (7) is satisfied, the aperture angles of the imaging lens system and the lighting lens system can be optionally set. However, since the angle $\theta_1$ becomes larger, the substantial distance between the electrodes 52 and 53 is increased, and thus the half-wavelength voltage is disadvantageously increased.

FIG. 7 shows an optical shutter module of a fifth embodiment composed of polarization shutter chips 50 having the shape of a combination of the shapes shown in FIGS. 5 and 6. For this chip 50, the steps 55 and 56 shown in FIG. 5 are replaced by inclined surfaces 52c and 53c. The light which is incident to the module at the incident angle $\theta_0$ and reflected from the electrode vertical surfaces 52a and 53a is reflected from the inclined surfaces 52c and 53c and does not outgo from the transmittable portions 51. On the other hand, the light which is incident to the module at an incident angle $\theta_4$ and reflected from the electrode vertical surfaces 52a and 53a, outgoes from the transmittable portions 51 at the angle equal to the incident angle.

Internally reflected light from vertical surfaces 54a of the separating grooves 54 and the cut surfaces 60a will be described below with reference to FIG. 8.

The angles shown in FIG. 8 have a relationship of $\theta_2 > \theta_1 > \theta_3$. The angle $\theta_2$ is assumed to satisfy the following expression (8).

$$\theta_2 \leq 90° - \sin^{-1} (1/n) \tag{8}$$

The satisfaction of the above expression (8) means that, when the internally reflected light from the separating groove vertical surfaces 54a and the cut surfaces 60a is incident to the inclined surfaces 54b and 60b, the light is totally reflected therefrom.

In the same manner as the discussion of FIG. 5, consider the cases that light is incident to the chips 50 at the incident angle $\theta_0$ and at the incident angle $\theta_4$, respectively ($\theta_0 < \theta_4$). Assuming that the refractive index of PLZT is taken as n, the incident angle and reflection angle on the cut surfaces 60a are represented by the following expressions (9) and (10).

$$90° - \sin^{-1} (\sin \theta_0/n) \tag{9}$$

$$90° - \sin^{-1} (\sin \theta_4/n) \tag{10}$$

It is assumed that the relationship between the angles $\theta_0$, $\theta_4$ and the angle $\theta_3$ is established as represented by the following expression (11).

$$\{\sin^{-1} (\sin \theta_4/n)\} > \theta_3 > \{\sin^{-1} (\sin \theta_0/n)\} \tag{11}$$

In this case, the light which is incident to the chips 50 at the incident angle $\theta_0$ and reflected from the cut surfaces 60a is reflected from the inclined surfaces 60b and does not outgo from the transmittable portions 51. On the other hand, the light which is incident to the chips 50 at the incident angle $\theta_4$ and reflected from the cut surfaces 60a outgoes from the transmittable portions 51 at the angle equal to the incident angle.

Therefore, as shown in FIGS. 17 and 18, if the imaging lens system or the lighting lens system is so constituted that the aperture angle $\theta k$ or $\theta r$ may satisfy the following expression (12) or (13), it is possible to prevent the receptor surface from being exposed to the internally reflected light from the cut surfaces 60a.

$$\theta k < \sin^{-1} (n \cdot \sin \theta_3) \quad (12)$$

$$\theta r < \sin^{-1} (n \cdot \sin \theta_3) \quad (13)$$

Figure 9:
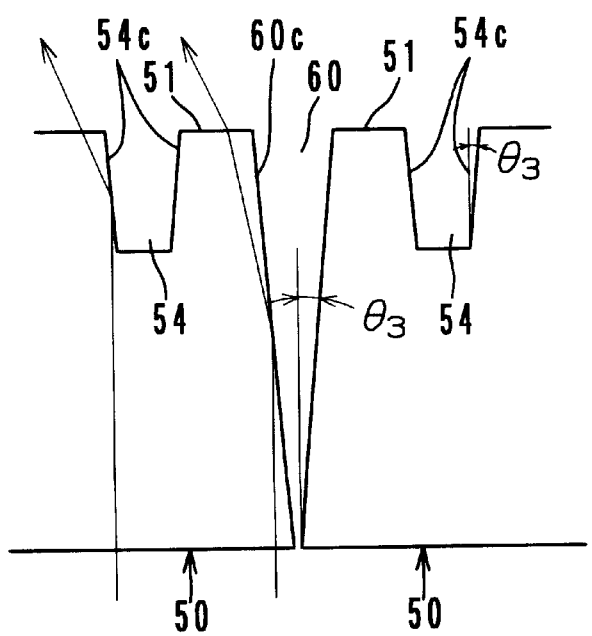
FIG. 9 is a cross sectional view of a sixth embodiment of the optical shutter module.

In an optical shutter module of a sixth embodiment shown in FIG. 9, the cut surfaces 60a and the separating groove vertical surfaces 54a shown in FIG. 8 are replaced by inclined cut surfaces 60c and inclined surfaces 54c, respectively. In this case, all the light reflected from the inclined cut surfaces 60c and the inclined surfaces 54c outgoes from the transmittable portions 51 at an emergent angle of $\sin^{-1}$ ($n \cdot \sin\theta_1$) or more depending on the angle $\theta_1$. Therefore, if the imaging lens system or the lighting lens system is so constituted that the aperture angle $\theta k$ or $\theta r$ may satisfy the above-described expression (12) or (13), all the light reflected from the inclined cut surfaces 60c and the inclined surfaces 54c can be blocked.

With respect to the polarization shutter chips 50 having the stereostructure shown in FIG. 9, as described above with reference to FIG. 6, the working process by the dicer is simplified. Additionally, if the inclined cut surfaces 60c and the inclined surfaces 54c are so formed to satisfy the above expression (7), all the light reflected from these surfaces are totally reflected from the transmittable portions 51 and does not outgo therefrom. In this case, the aperture angles of the imaging lens system and the lighting lens system can be optionally set.

Incidentally, in the third to sixth embodiments shown in FIGS. 4–9, externally reflected light from the separating grooves and the chip cut surfaces remain in the form of leakage light.

Figure 10:
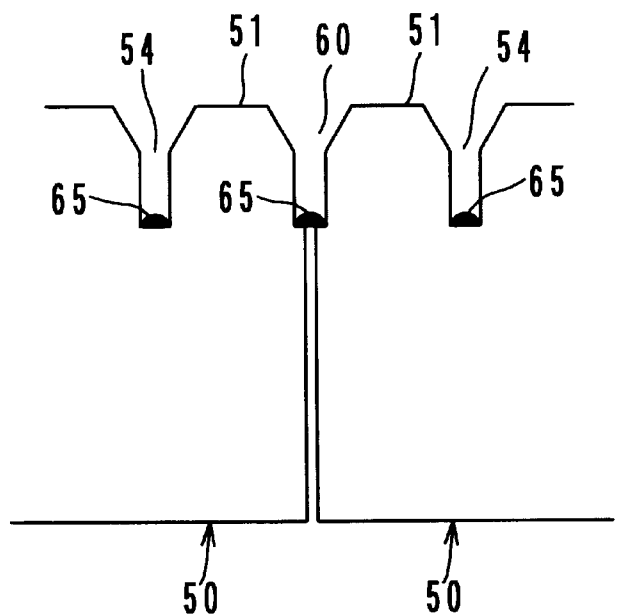
FIG. 10 is a cross sectional view of a seventh embodiment of the optical shutter module.

Therefore, in an optical shutter module of a seventh embodiment shown in FIG. 10, coating 65 such as light-blocking or light-absorbing resin or ink is applied to the bottoms of the separating grooves 54 and the stages of the seams 60. The whole separating grooves 54 and seams 60 may be filled with the coating 65.

Figure 11:
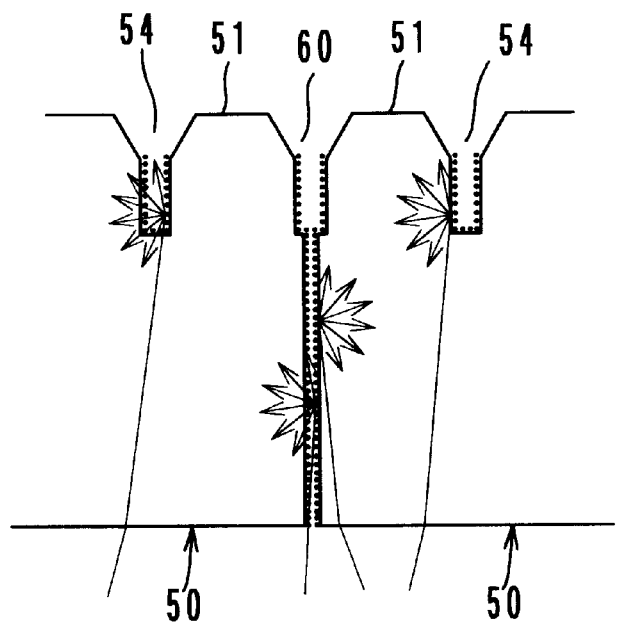
FIG. 11 is a cross sectional view of an eighth embodiment of the optical shutter module.
Figure 12:
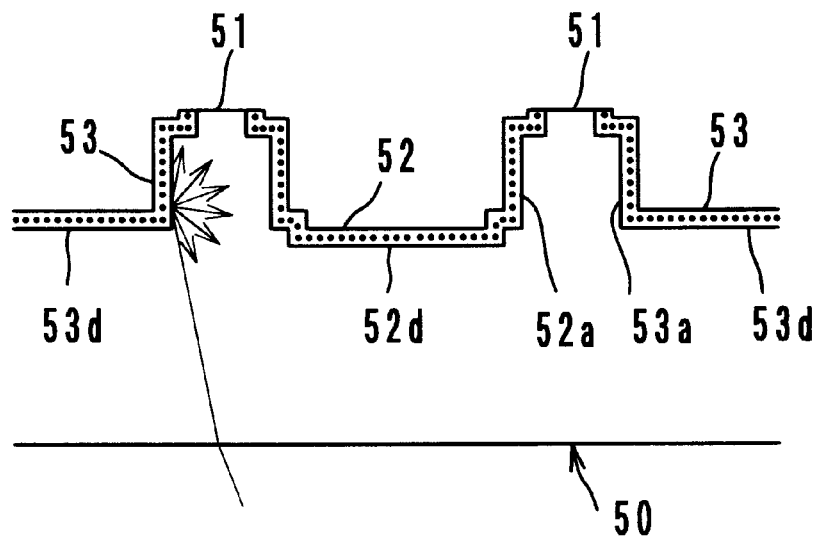
FIG. 12 is a cross sectional view of the eighth embodiment cut on another surface.

An optical shutter module of an eighth embodiment shown in FIGS. 11 and 12 is adapted so as to roughen not only the separating grooves 54 and the seams 60 but also the common-electrode-formed surfaces 52a and 52d and the separate-electrode-formed surfaces 53a and 53d. Light which is incident to such a rough surface is diffuse-reflected regardless of whether it is externally or internally reflected light, and thus leakage light reaching the receptor surface through the imaging lens system is considerably reduced. The rough formation of the stereostructural surfaces of the polarization shutter chips 50 can be accomplished, for example, by the use of a blade of a large abrasive grain diameter when the surfaces are formed by a dicer.

In the eighth embodiment shown in FIGS. 11 and 12, the surface roughening is replaced by provision of layers with a high light absorption coefficient for the surfaces, which is also effective for the reduction of leakage light. More particularly, the coating 65 shown in FIG. 10 may be applied to or filled into the separating grooves 54 and the seams 60. A chrome oxide layer may be formed on each of the electrode-formed surfaces 52a, 52d, 53a and 53d, and then a metallic layer of aluminum or the like may be deposited on the chrome oxide layer. Alternatively, layers with a high light absorption coefficient are disposed on the roughened surfaces, whereby leakage light can be more effectively reduced.

Not only the vertical surfaces but also the horizontal surfaces 52d and 53d are processed so as to reduce the reflectance, because the reduction of the reflectance allows a scattered light to be reduced and thus permits the image contrast to be improved.

Figure 13:
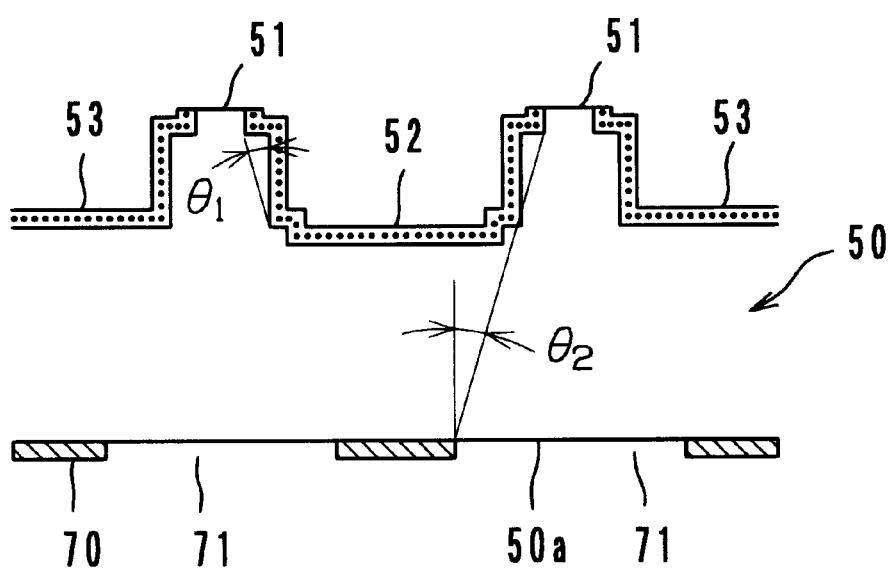
FIG. 13 is a cross sectional view of a ninth embodiment of the optical shutter module.

Also, an optical shutter module of a ninth embodiment shown in FIG. 13 can be constituted. In the ninth embodiment, a mask 70 is disposed on an incident surface 50a of each polarization shutter chip 50 so as to limit illuminating light other than light which will be incident to the transmittable portions 51, whereby scattered light can be reduced within the chip 50. The size of an opening 71 of this mask 70 is determined depending on the aperture angle of the lighting lens system or imaging lens system and the dimensions of the transmittable portions 51. For example, when the aperture angle of the lighting lens system or imaging lens system is larger than the angle $\theta_1$, the angle $\theta_2$ is set larger than the angle $\theta_1$, whereby the quantity of light emergent from the print head is not reduced. Although any material can be used for the mask 70 as long as the mask 70 can block the light from passing therethrough, a material of high reflectance such as a metallic layer is preferable.

Figure 14:
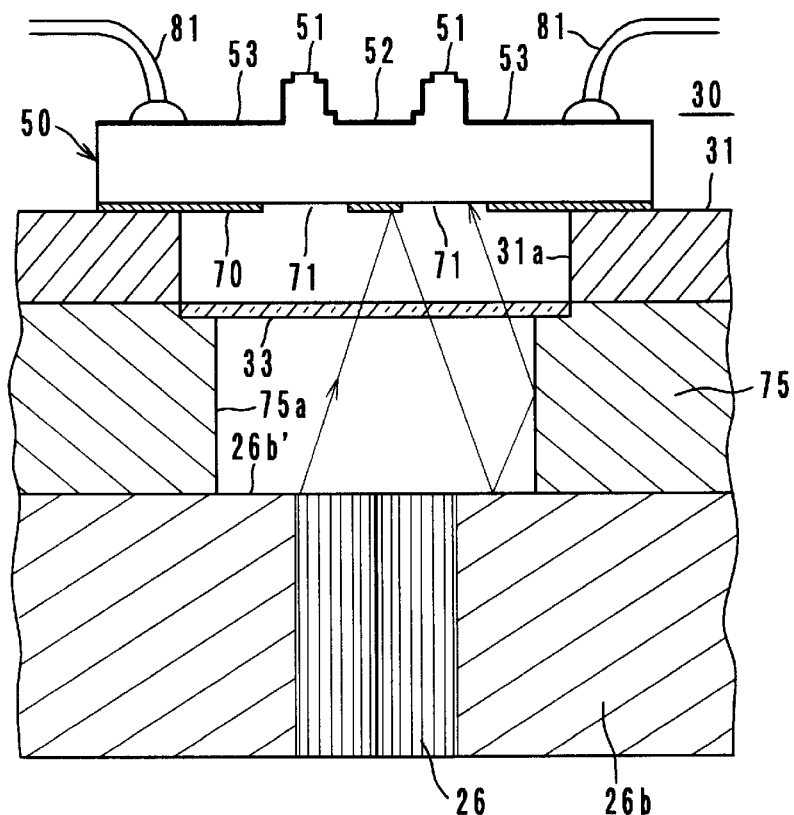
FIG. 14 is a cross sectional view of an exemplary constitution using the optical shutter module shown in FIG. 13.

FIG. 14 shows an exemplary constitution of a connecting portion between the optical shutter module shown in FIG. 13 and the fiber array 26. In this example, a light guide 75 is put between the end base 26b of the fiber array 26 and a module substrate 31 so as to provide a closed space. The light guide 75 is a metallic plate whose inner surfaces 75a are mirror-finished. An end surface 26b' of the base 26b is also mirror-finished. Light reflected from the mask 70 is reflected from the end surface 26b' and the inner surfaces 75a, and the light is incident to the mask opening 71 as effective light. In such a manner, the light usage efficiency is improved, and thus the quantity of light emergent from the print head is increased.

In the exemplary constitution shown in FIG. 14, preferably, the base end surface 26b' and the light guide inner surfaces 75a are shaped so that much light reflected from the mask 70 may be incident to the opening 71 at a desired angle. For example, the reflecting surfaces may be shaped into inclined surfaces or uneven surfaces besides the vertical surfaces. A titanium oxide layer or the like may be also disposed on the mask 70, the base end surface 26b' and the light guide inner surfaces 75a so that light is diffuse-reflected. When the titanium oxide layer or the like is disposed on the mask 70 so as to diffuse-reflect light, the light usage efficiency is improved, and thus the light guide 75 can be eliminated.

In the exemplary constitution shown in FIG. 14, preferably, opening inner surfaces 31a are greatly separated from an optical path, or light absorption layers are disposed on the inner surfaces 31a so that light which passes through the polarizer 33 and is reflected from the opening inner surfaces 31a of the substrate 31 may not pass through the transmittable portions 51 and may not be focused on the receptor surface.

Figure 15:
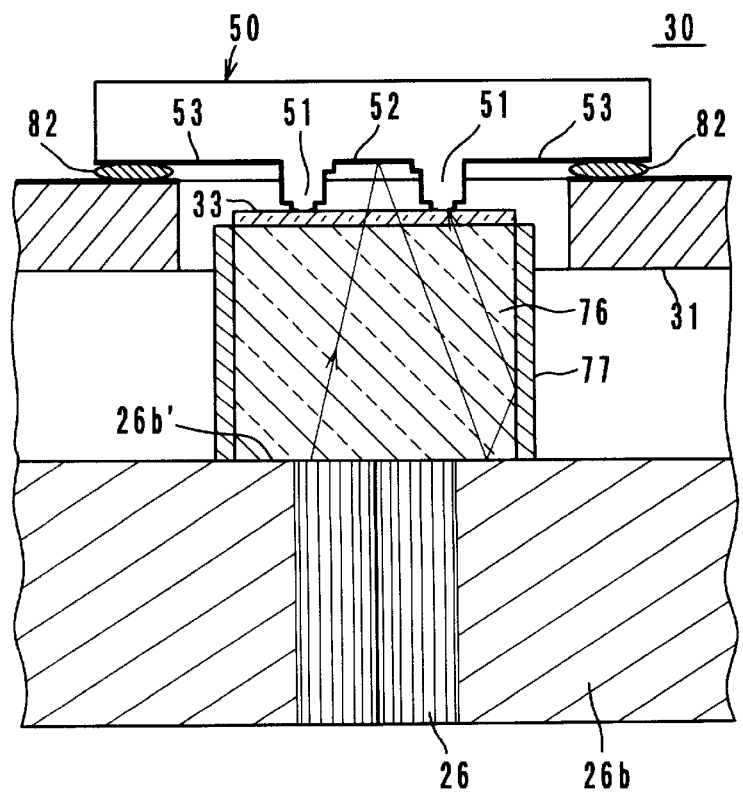
FIG. 15 is a cross sectional view of another exemplary constitution using the optical shutter module shown in FIG. 13.

FIG. 15 shows another exemplary constitution. In this exemplary constitution, the polarization shutter chips 50 are set in the opposite direction to the above-described direction with respect to the direction of incidence of light. The common electrode 52 and the separate electrodes 53 function in the same manner as the mask 70 shown in FIG. 14. These electrodes prevent light illuminating the portions other than the transmittable portions 51 from being incident to the chip 50. As a result, scattered light is reduced within the chip 50, and thus the image contrast can be also enhanced. Moreover, light reflected from the electrodes 52 and 53 is reflected in the closed space formed by the base 26b of the fiber array 26 and a light guide 76, and the light is incident to the transmittable portions 51 as effective light. In this way, the light usage efficiency is improved, and thus the quantity of light emergent from the print head is increased. In addition, since the polarizer 33 is adjacent to the chip 50, the closed space between the chip 50 and the fiber array 26 is smaller than the space shown in FIG. 14, and thus the quantity of emergent light is increased more.

As the light guide 76, used is an object with a metallic layer 77 such as chrome on the side surfaces of a transparent material such as glass and PMMA. If the side surfaces of the transparent material can totally reflect internally reflected light, the metallic layer 77 may be eliminated. Alternatively, the metallic layer 77 may be replaced by a diffusion layer containing titanium oxide or the like.

Although the connection between the electrodes 52, 53 and the electrode formed on the substrate 31 is done by the use of a wire 81 in FIG. 14 and a solder 82 in FIG. 15, either of them may be used. Although a substrate with an opening is used as the substrate 31 in any exemplary constitution, the substrate 31 may be a transparent material such as glass.

The present invention is applicable to an optical shutter device which is employed in an apparatus for writing an image on an electrophotographic photosensitive member and an optical shutter device which is employed in an apparatus for projecting an image on a display as well as the optical shutter device which is employed in an apparatus for writing an image on a photographic paper made of a silver halide photosensitive material.

Although the present invention has been described in connection with the preferred embodiments above, it is to be noted that various changes and modifications are apparent to a person skilled in the art. Such changes and modifications are to be understood as being within the scope of the present invention.

What is claimed is:

1. An optical shutter device comprising:
    a polarization shutter chip of a stereostructure including at least one shutter element;
    a first optical system for directing light emitted from a light source to the polarization shutter chip, the first optical system having a first aperture angle; and
    a second optical system for focusing light emergent from the polarization shutter chip on a receptor surface, the second optical system having a second aperture angle;
    wherein at least one of the first aperture angle and the second aperture angle is a value which prevents all light components reflected on vertical surfaces of the polarization shutter chip from being focused on a receptor surface.

2. An optical shutter device as claimed in claim 1, wherein the first aperture angle is said value.

3. An optical shutter device as claimed in claim 1, wherein the second aperture angle is said value.

4. An optical shutter device comprising:
    a polarization shutter chip having a first window on an incident side and a second window on an emergent side, said first window defining an area of the incident side through which light is capable of entering to said polarization shutter, said second window defining an area of the emerging side through which light is capable of emerging from said polarization shutter; and
    an optical system for focusing light emerged from the polarization shutter chip on a receptor surface;
    wherein a shape of said first window and a shape of said second window have a relationship so that all light components reflected on inner surfaces of the polarization shutter chip are prevented from being focused on a receptor surface.

5. An optical shutter device as claimed in claim 4, wherein said first window is larger than said second window.

6. An optical shutter device comprising:
    a polarization shutter chip with a specified surface;
    a polarizer which is located at an incident side of the polarization shutter chip and transmits light with a first direction of polarization; and
    an analyzer which is located at an emergent side of the polarization shutter chip and transmits light with a second direction of polarization;
    wherein the first direction of polarization and the second direction of polarization have a relationship so that light which passes through the polarizer and is reflected on the specified surface of the polarization shutter chip is prevented from passing through the analyzer, and
    wherein one of the first direction of polarization and the second direction of polarization is parallel to the specified surface of the polarization shutter chip, and the other is perpendicular to the specified surface.

7. An optical shutter device as claimed in claim 6, wherein a direction of an electrical field applied to said polarization shutter chip is inclined relative to the specified surface at 45 degrees.

* * * * *